US012748013B2

(12) United States Patent
Arai et al.

(10) Patent No.: US 12,748,013 B2
(45) Date of Patent: Sep. 29, 2026

(54) LIFETIME ESTIMATION SYSTEM FOR WORKING MACHINE

(71) Applicant: KUBOTA CORPORATION, Osaka (JP)

(72) Inventors: Yasuhiko Arai, Osaka (JP); Keisuke Miura, Osaka (JP); Shinichi Morita, Osaka (JP); Shuya Ueda, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 450 days.

(21) Appl. No.: 18/207,330

(22) Filed: Jun. 8, 2023

(65) Prior Publication Data

US 2023/0313501 A1 Oct. 5, 2023

Related U.S. Application Data

(63) Continuation of application No. PCT/JP2021/045028, filed on Dec. 8, 2021.

(30) Foreign Application Priority Data

Feb. 16, 2021 (JP) ................................ 2021-022857

(51) Int. Cl.
*G01M 5/00* (2006.01)

(52) U.S. Cl.
CPC ................................ *G01M 5/0041* (2013.01)

(58) Field of Classification Search
CPC .. G01M 5/0041; G05B 23/02; G05B 23/0283
See application file for complete search history.

(56) References Cited

U.S. PATENT DOCUMENTS 7,908,928 B2 * 3/2011 Vik .................... G01M 17/007 73/806
2010/0100338 A1 4/2010 Vik et al.
(Continued)

FOREIGN PATENT DOCUMENTS

JP 2009-133194 A 6/2009
JP 2009-162647 A 7/2009
(Continued)

OTHER PUBLICATIONS

International Search Report issued Feb. 22, 2022 in International application PCT/JP2021/045028, with English language translation thereof.

(Continued)

*Primary Examiner* — Jennifer Bahls
(74) *Attorney, Agent, or Firm* — Greenblum & Bernstein, P.L.C.

(57) ABSTRACT

A lifetime estimation system for a working machine is a lifetime estimation system for a working machine including a work portion provided on a machine body, a hydraulic actuator to actuate the work portion, and an operation detector to detect operation information obtained when the work portion and/or the hydraulic actuator is/are actuated. The lifetime estimation system includes a strain calculator to calculate a strain of a target portion to be subjected to lifetime estimation based on the operation information detected by the operation detector, and a lifetime calculator to calculate a lifetime of the target portion from the strain calculated by the strain calculator.

3 Claims, 7 Drawing Sheets

(56) References Cited

U.S. PATENT DOCUMENTS

| | | | | |
|---|---|---|---|---|
| 2013/0167227 | A1* | 6/2013 | Miura | B66C 17/18 726/19 |
| 2018/0283221 | A1* | 10/2018 | Reigl | G05B 23/0283 |

FOREIGN PATENT DOCUMENTS

| | | | |
|---|---|---|---|
| JP | 2012-007387 | A | 1/2012 |
| JP | 2014-025343 | A | 2/2014 |
| JP | 2014-085293 | A | 5/2014 |
| JP | 2014-163047 | A | 9/2014 |
| JP | 2016-003462 | A | 1/2016 |
| JP | 5887405 | B2 | 3/2016 |

OTHER PUBLICATIONS

Written Opinion issued Feb. 22, 2022 in International application PCT/JP2021/045028, with English language translation thereof.

Supplementary European Search Report, dated Jan. 8, 2025, issued in European Patent Office (EPO) Patent Application No. 21926756.4.

* cited by examiner

LIFETIME ESTIMATION SYSTEM FOR WORKING MACHINE

CROSS REFERENCE TO RELATED APPLICATIONS

This application is a continuation application of International Application No. PCT/JP2021/045028, filed on Dec. 8, 2021, which claims the benefit of priority to Japanese Patent Application No. 2021-022857, filed on Feb. 16, 2021. The entire contents of each of these applications are hereby incorporated herein by reference.

BACKGROUND OF THE INVENTION

1. Field of the Invention

The present invention relates to a lifetime estimation system for a working machine.

2. Description of the Related Art

A system for diagnosing a failure of a working machine disclosed in Japanese Unexamined Patent Application Publication No. 2014-25343 has been known.

A system for acquiring an operation status of a working machine according to Japanese Unexamined Patent Application Publication No. 2014-25343 includes a transmitter to transmit operation statuses in individual portions of the working machine to a server by email, and a computer capable of accessing the server. The computer includes a status acquirer to access the server and acquire an operation status stored in the server, a display to display the operation status acquired by the status acquirer, and a failure estimator to automatically estimate a failure of the working machine based on the acquired operation status.

SUMMARY OF THE INVENTION

The system for acquiring an operation status of a working machine disclosed in Japanese Unexamined Patent Application Publication No. 2014-25343 is capable of diagnosing a failure from an operation status in a case where an error, a warning, or the like occurs, but is actually incapable of estimating the lifetime of a member included in the working machine.

Preferred embodiments of the present invention provide lifetime estimation systems for a working machine, each capable of easily estimating the lifetime of member(s) included in the working machine based on operation information of the working machine.

A lifetime estimation system for a working machine according to an aspect of the present invention is a lifetime estimation system for a working machine including a work portion provided on a machine body, a hydraulic actuator to actuate the work portion, and an operation detector to detect operation information obtained when the work portion and/or the hydraulic actuator is or are actuated, the lifetime estimation system including: a strain calculator to calculate a strain of a target portion to be subjected to lifetime estimation based on the operation information detected by the operation detector; and a lifetime calculator to calculate a lifetime of the target portion from the strain calculated by the strain calculator.

The operation detector may be operable to detect, as the operation information, a hydraulic cylinder pressure which is a hydraulic pressure of a hydraulic cylinder as the hydraulic actuator, and attitude information which is information about an attitude of the work portion. The strain calculator may be configured or programmed to calculate the strain based on the hydraulic cylinder pressure and the attitude information.

The operation detector may be operable to detect, as the attitude information, a rotation angle of a member included in the work portion relative to another member or a stroke of the hydraulic cylinder.

The lifetime calculator may be configured or programmed to calculate the lifetime of the target portion based on the number of occurrences of a strain equal to or greater than a predetermined value.

The lifetime estimation system may further include a communicator provided in or on the working machine to transmit the operation information; and a manager to estimate the lifetime of the target portion included in the working machine based on the operation information transmitted from the communicator, the manager including the strain calculator and the lifetime calculator.

The working machine may include the strain calculator and a communicator to transmit information about the strain calculated by the strain calculator. The lifetime estimation system may include a manager to estimate the lifetime of the target portion included in the working machine based on the information about the strain transmitted from the communicator, the manager including the lifetime calculator.

The working machine may include the strain calculator and the lifetime calculator.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
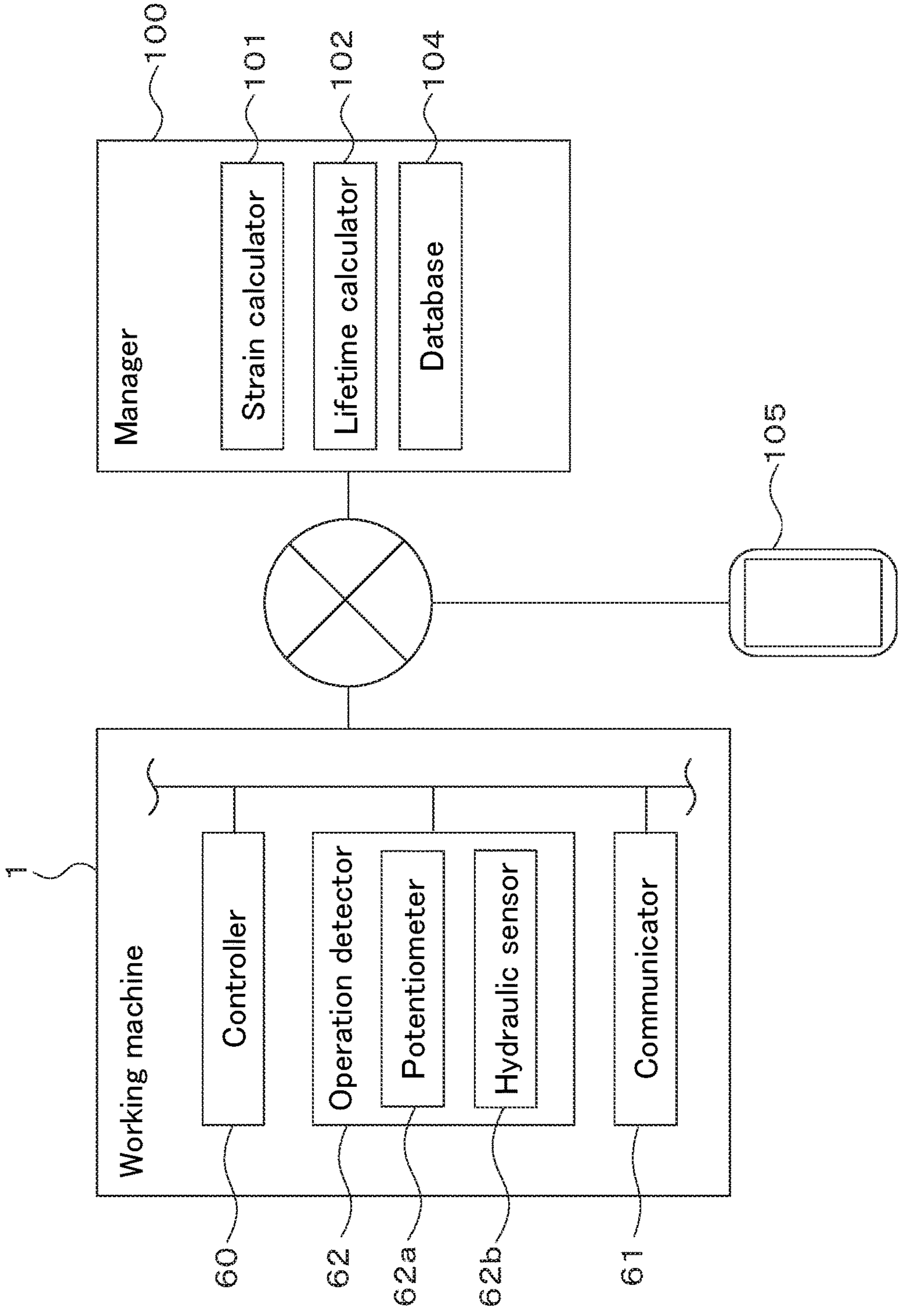
FIG. 1 illustrates an overall view of a lifetime estimation system for a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings as appropriate.

FIG. 1 illustrates an overall view of a lifetime estimation system for a working machine. The lifetime estimation system for a working machine is a system for collecting operation information from a plurality of working machines 1 and estimating the lifetime of a target portion to be subjected to lifetime estimation (lifetime estimation target portion) in each working machine 1.

Figure 7:
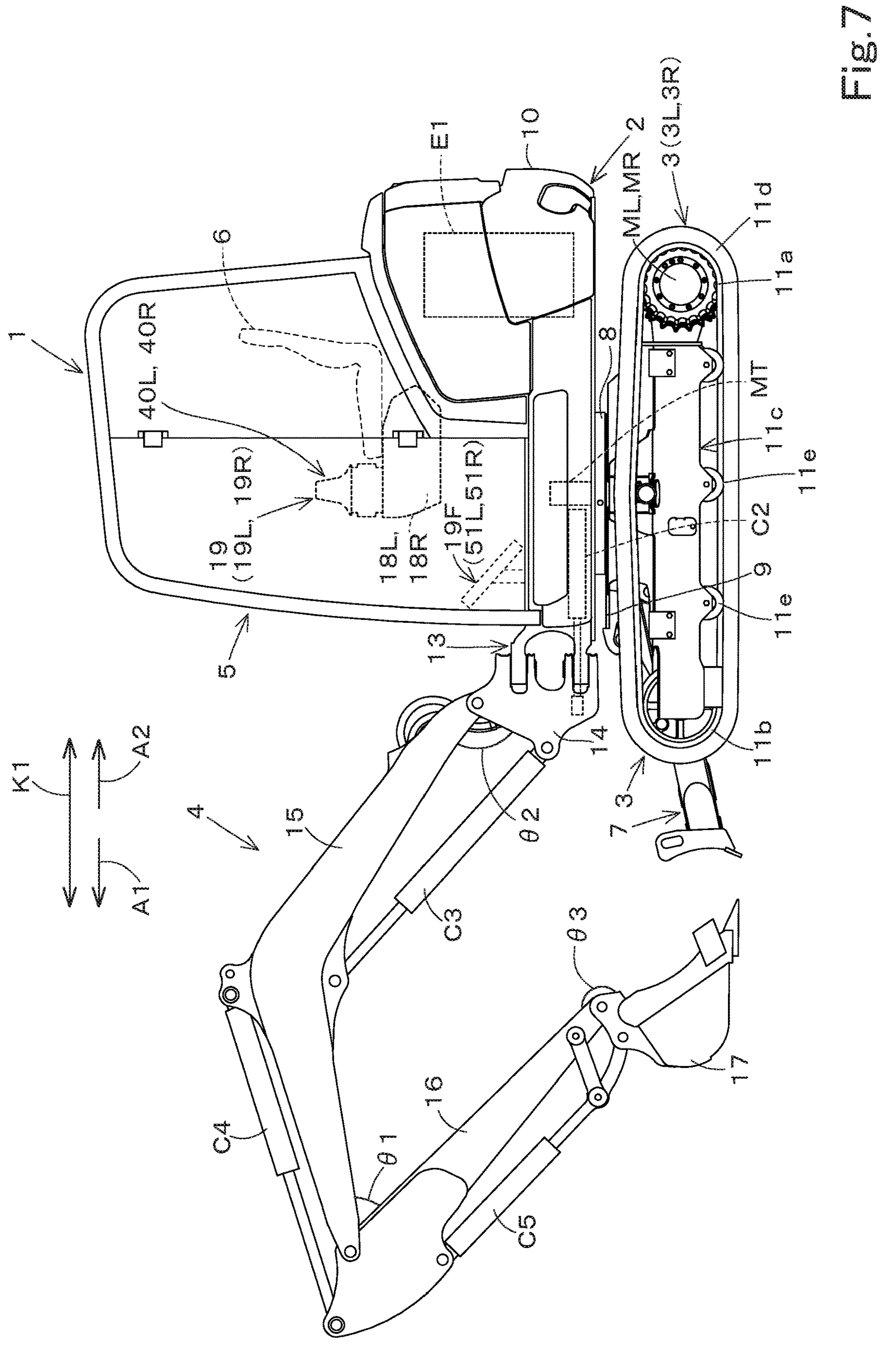
FIG. 7 illustrates a side view of a backhoe.

First, the working machine 1 will be described. FIG. 7 illustrates the working machine 1, which is a backhoe, which a swivel working machine. The working machine 1 is not limited to a backhoe, and may be a construction machine such as a loader, or an agricultural machine such as a tractor, a combine, or a rice transplanter.

As illustrated in FIG. 7, the working machine 1 includes a machine body (swivel base) 2, a traveling device 3, and a working device 4. A cabin 5 is mounted on the machine body 2. The cabin 5 has an operator's seat 6 therein.

In the present embodiment, a direction in which an operator seated on the operator's seat 6 of the working machine 1 is oriented (the direction indicated by an arrow A1 in FIG. 7) is referred to as a forward direction, and the opposite direction thereof (the direction indicated by an arrow A2 in FIG. 7) is referred to as a rearward direction. A leftward direction of the operator (the near side of FIG. 7) is referred to as a leftward direction, and a rightward direction of the operator (the far side of FIG. 7) is referred to as a rightward direction.

A horizontal direction that is orthogonal to a forward-rearward direction K1 is referred to as a machine-body-width direction. A rightward or leftward direction from a central portion in the width direction of the machine body 2 is referred to as a machine-body-outward direction. In other words, the machine-body-outward direction is the machine-body-width direction and is a direction away from the center in the width direction of the machine body 2. A direction opposite to the machine-body-outward direction is referred to as a machine-body-inward direction. In other words, the machine-body-inward direction is the machine-body-width direction and is a direction approaching the center in the width direction of the machine body 2.

As illustrated in FIG. 7, the traveling device 3 includes a traveling body 3L provided on the left and a traveling body 3R provided on the right. The traveling body 3L and the traveling body 3R are each a crawler traveling device including a driving wheel 11*a*, a driven wheel 11*b*, a plurality of track rollers 11*e*, a frame 11*c*, and a belt 11*d*. The frame 11*c* rotatably supports the driving wheel 11*a*, the driven wheel 11*b*, and the track rollers 11*e*. The belt 11*d* is stretched around the driving wheel 11*a*, the driven wheel 11*b*, and the track rollers 11*e*.

The frame 11*c* of the traveling body 3L supports a first traveling motor ML. The power of the first traveling motor ML is transmitted to the driving wheel 11*a* of the traveling body 3L. The frame 11*c* of the traveling body 3R supports a second traveling motor MR. The power of the second traveling motor MR is transmitted to the driving wheel 11*a* of the traveling body 3R.

A dozer device 7 is attached to a front portion of the traveling device 3. The dozer device 7 can be raised and lowered (the blade can be raised and lowered) by extending and contracting a dozer cylinder. The working machine 1 may have a configuration not including the dozer device 7.

The machine body 2 is supported on the traveling device 3 via a swivel bearing 8 so as to be capable of swiveling around a vertical axis (an axis extending in a vertical direction). The machine body 2 is driven to swivel by a swivel motor MT constituted by a hydraulic motor (hydraulic actuator). The machine body 2 includes a swivel plate 9 that swivels around a vertical axis, and a weight 10. The swivel plate 9 is formed of a steel plate or the like, and is coupled to the swivel bearing 8. The weight 10 is provided at a rear portion of the machine body 2. The rear portion of the machine body 2 is provided with a prime mover E1. The prime mover E1 is a diesel engine. The prime mover E1 may be an electric motor, or may be a hybrid of a diesel engine and an electric motor.

The machine body 2 includes a support bracket 13 at a front portion slightly to the right of the center in the machine-body-width direction. A swing bracket 14 is attached to the support bracket 13 so as to be swingable around a vertical axis. The working device 4 is attached to the swing bracket 14.

As illustrated in FIG. 7, the working device 4 includes work portion(s) such as a boom 15, an arm 16, and/or a bucket (working tool) 17. A base portion of the boom 15 is pivotally attached to the swing bracket 14 so as to be rotatable around a horizontal axis (an axis extending in the machine-body-width direction). Thus, the boom 15 is swingable up and down. The arm 16 is pivotally attached to a distal end side of the boom 15 so as to be rotatable around a horizontal axis. Thus, the arm 16 is swingable back and forth or up and down. The bucket 17 is provided on a distal end side of the arm 16 so as to be capable of shoveling and dumping. The working machine 1 may be equipped with another working tool (auxiliary attachment) that can be driven by a hydraulic actuator, instead of or in addition to the bucket 17. Examples of the other working tool (auxiliary attachment) include a hydraulic breaker, a hydraulic crusher, an angle broom, an earth auger, a pallet fork, a sweeper, a mower, and a snow blower.

The swing bracket 14 is swingable by extension and contraction of a swing cylinder C2 provided in the machine body 2. The boom 15 is swingable by extension and contraction of a boom cylinder C3. The arm 16 is swingable by extension and contraction of an arm cylinder C4. The bucket 17 is capable of shoveling and dumping by extension and contraction of a bucket cylinder (working tool cylinder) C5. The dozer cylinder, the swing cylinder C2, the boom cylinder C3, the arm cylinder C4, and the bucket cylinder C5 are each constituted by a hydraulic cylinder (hydraulic actuator).

The working device 4 may include member(s) other than the boom 15, the arm 16, and the bucket (working tool) 17, as long as the working device 4 is provided on the machine body 2. The boom cylinder C3, the arm cylinder C4, the bucket cylinder C5, and so forth are hydraulic actuators that drive the work portions.

Figure 2:
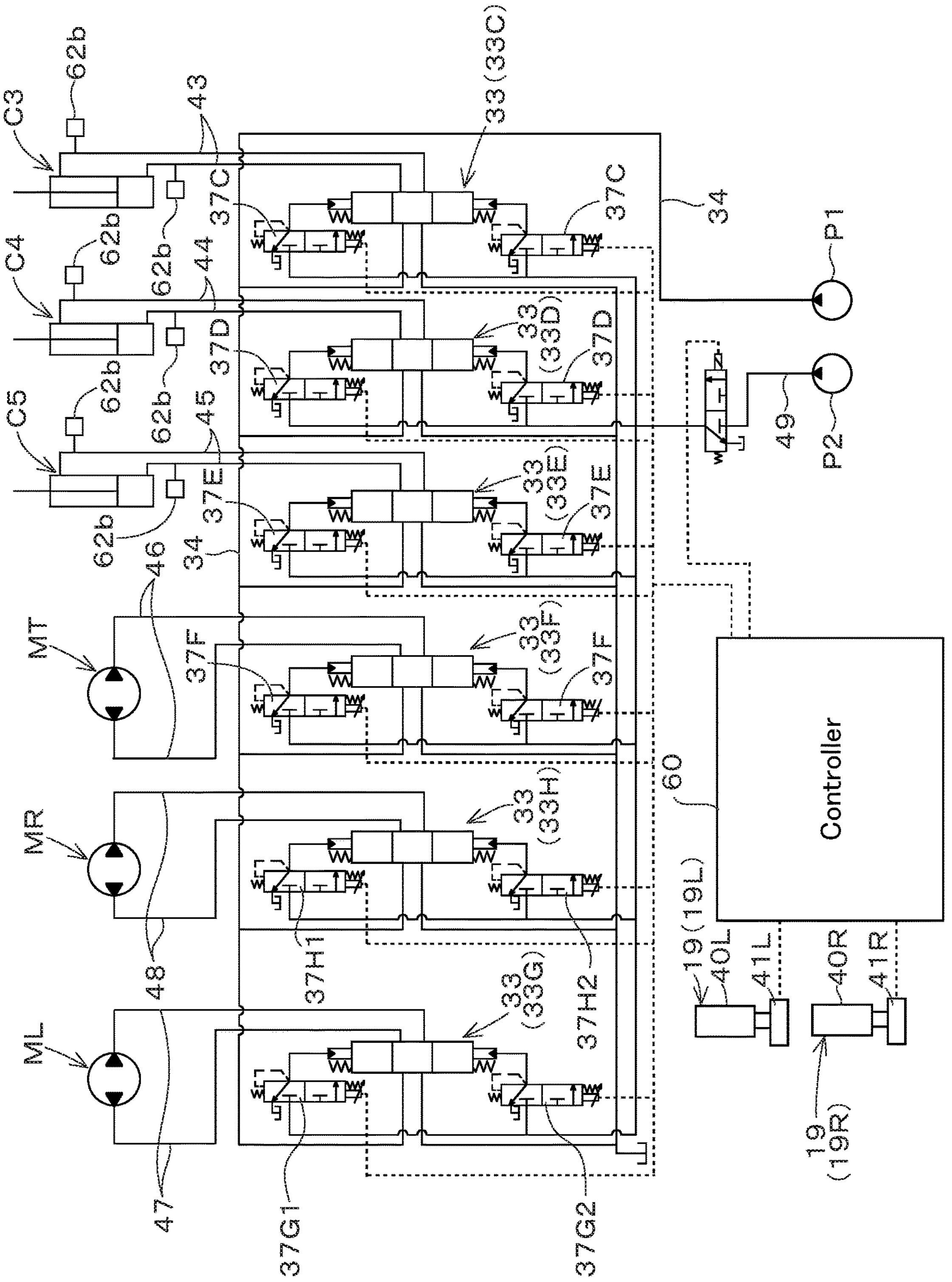
FIG. 2 is a schematic diagram of a hydraulic system (hydraulic circuit) of the working machine.

FIG. 2 illustrates an overview of a hydraulic circuit (hydraulic system) that actuates the hydraulic actuators of the working machine 1.

As illustrated in FIG. 2, the hydraulic system of the working machine 1 is a system for activating working-system hydraulic actuators such as the boom cylinder C3, the arm cylinder C4, the bucket cylinder C5, and the swivel motor MT, and traveling-system hydraulic actuators such as the first traveling motor ML and the second traveling motor MR. In FIG. 2 illustrating the hydraulic system, circuits for controlling the dozer cylinder and the swing cylinder C2 are omitted for convenience of description. In addition, hydraulic sensors 62*b* that detect respective pressures (hydraulic cylinder pressures) of the boom cylinder C3, the arm cylinder C4, and the bucket cylinder C5 are provided near ports through which hydraulic fluids are introduced/discharged in the boom cylinder C3, the arm cylinder C4, and the bucket cylinder C5.

The hydraulic system of the working machine 1 includes a first hydraulic pump P1, a second hydraulic pump P2, and a plurality of control valves 33. The first hydraulic pump P1 is a pump that supplies a hydraulic fluid to the working-system hydraulic actuators and the traveling-system hydraulic actuators. The first hydraulic pump P1 is, for example, a fixed displacement pump or a variable displacement pump. The second hydraulic pump P2 is a pump that supplies a hydraulic fluid for signals or control, that is, a pilot fluid. The plurality of control valves 33 are valves that control the working-system hydraulic actuators and the traveling-system hydraulic actuators. The first hydraulic pump P1 is connected to the plurality of control valves 33 through a fluid passage 34. The number of hydraulic pumps provided in the working machine 1 is not particularly limited. For example, a plurality of pumps that supply hydraulic fluids to the working-system hydraulic actuators and the traveling-system hydraulic actuators may be provided.

The plurality of control valves 33 include a boom control valve 33C that controls the boom cylinder C3, an arm control valve 33D that controls the arm cylinder C4, a bucket control valve 33E that controls the bucket cylinder C5, a swivel control valve 33F that controls the swivel motor MT, a first traveling control valve 33G that controls the first traveling motor ML, and a second traveling control valve 33H that controls the second traveling motor MR.

The boom control valve 33C is connected to the boom cylinder C3 through a fluid passage 43. The arm control valve 33D is connected to the arm cylinder C4 through a fluid passage 44. The bucket control valve 33E is connected to the bucket cylinder C5 through a fluid passage 45. The swivel control valve 33F is connected to the swivel motor MT through a fluid passage 46. The first traveling control valve 33G is connected to the first traveling motor ML through a fluid passage (first fluid passage) 47. The second traveling control valve 33H is connected to the second traveling motor MR through a fluid passage (second fluid passage) 48.

A boom solenoid valve 37C is connected to a pressure receiver of the boom control valve 33C. An arm solenoid valve 37D is connected to a pressure receiver of the arm control valve 33D. A bucket solenoid valve 37E is connected to a pressure receiver of the bucket control valve 33E. A swivel solenoid valve 37F is connected to a pressure receiver of the swivel control valve 33F. A forward solenoid valve 37G1 and a rearward solenoid valve 37G2 are connected to a pressure receiver of the first traveling control valve 33G. A forward solenoid valve 37H1 and a rearward solenoid valve 37H2 are connected to a pressure receiver of the second traveling control valve 33H.

That is, the solenoid valves (37C, 37D, 37E, 37F, 37G1, 37G2, 37H1, and 37H2) are connected to the respective control valves 33. The second hydraulic pump P2 is connected to each solenoid valve through a fluid passage (pilot fluid passage) 49. In accordance with the opening of the solenoid valve, the pilot pressure that acts on the pressure receiver of the control valve 33 corresponding to the solenoid valve 37 changes.

In the present embodiment, a description will be given of a configuration of controlling the operation of a control valve by electronically controlling the opening of a solenoid valve provided in a pilot fluid passage, but the hydraulic control method is not limited thereto. For example, a pilot pressure that acts on a control valve may be controlled by operating, using a manipulation member, a remote control valve (pilot operation valve) provided in a pilot fluid passage, or a control valve may be constituted by a solenoid valve and the operation of the control valve may be directly and electronically controlled.

The boom control valve 33C, the arm control valve 33D, the bucket control valve 33E, the swivel control valve 33F, the first traveling control valve 33G, and the second traveling control valve 33H are, for example, switching valves of a direct-acting spool type. Each of the plurality of control valves 33 (33C, 33D, 33E, 33F, 33G, and 33H) switches the direction or the like of the hydraulic fluid supplied to the control valve 33 by using a pilot fluid that acts on the pressure receiver via the solenoid valve corresponding to the control valve 33. Accordingly, each of the plurality of control valves 33 controls the flow rate or the like of the hydraulic fluid to be supplied to a corresponding one of the working-system hydraulic actuators (the boom cylinder C3, the arm cylinder C4, the bucket cylinder C5, and the swivel motor MT) or the traveling-system hydraulic actuators (the first traveling motor ML and the second traveling motor MR).

The working-system hydraulic actuators are operated by using a manipulator 19 (a manipulator 19L, a manipulator 19R). The manipulator 19L includes a manipulation member 40L and a first manipulation detector 41L. The manipulation member 40L is a lever pivotally movable in forward, rearward, rightward, and leftward directions from a neutral position. The first manipulation detector 41L detects the amount of pivot of the manipulation member 40L. The first manipulation detector 41L is a potentiometer that detects the amount of pivot (the amount of manipulation) of the manipulation member 40L in a forward, rearward, rightward, or leftward direction from the neutral position.

Upon manipulation of the manipulation member 40L by an operator or the like, the first manipulation detector 41L detects the amount and direction of manipulation of the manipulation member 40L. The first manipulation detector 41L inputs the detected amount and direction of manipulation of the manipulation member 40L to a controller 60. The controller 60 energizes the solenoid of the swivel solenoid valve 37F connected to the pressure receiver of the swivel control valve 33F in accordance with the amount and direction of manipulation of the manipulation member 40L. Accordingly, the controller 60 controls the opening of the swivel solenoid valve 37F. As a result, a pilot pressure acts on the pressure receiver of the swivel control valve 33F, the position of the swivel control valve 33F is switched, and the rotation direction of the swivel motor MT is switched in accordance with the position.

In addition, the controller 60 energizes the solenoid of the arm solenoid valve 37D connected to the pressure receiver of the arm control valve 33D in accordance with the amount and direction of manipulation of the manipulation member 40L. Accordingly, the controller 60 controls the opening of the arm solenoid valve 37D. As a result, a pilot pressure acts on the pressure receiver of the arm control valve 33D, the position of the arm control valve 33D is switched, and the arm cylinder C4 extends or contracts in accordance with the position.

The manipulator 19R includes a manipulation member 40R and a second manipulation detector 41R. The manipulation member 40R is a lever pivotally movable in forward, rearward, rightward, and leftward directions from a neutral position. The second manipulation detector 41R detects the amount of pivot of the manipulation member 40R. The second manipulation detector 41R is a potentiometer that detects the amount of pivot (the amount of manipulation) of the manipulation member 40R in a forward, rearward, rightward, or leftward direction from the neutral position.

Upon manipulation of the manipulation member 40R by an operator or the like, the second manipulation detector 41R detects the amount and direction of manipulation of the manipulation member 40R. The second manipulation detector 41R inputs the detected amount and direction of manipulation of the manipulation member 40R to the controller 60. The controller 60 energizes the solenoid of the boom solenoid valve 37C connected to the pressure receiver of the boom control valve 33C in accordance with the amount and direction of manipulation of the manipulation member 40R. Accordingly, the controller 60 controls the opening of the boom solenoid valve 37C. As a result, a pilot pressure acts on the pressure receiver of the boom control valve 33C, the position of the boom control valve 33C is switched, and the boom cylinder C3 extends or contracts in accordance with the position.

In addition, the controller 60 energizes the solenoid of the bucket solenoid valve 37E connected to the pressure receiver of the bucket control valve 33E in accordance with the amount and direction of manipulation of the manipulation member 40R. Accordingly, the controller 60 controls the opening of the bucket solenoid valve 37E. As a result, a pilot pressure acts on the pressure receiver of the bucket control valve 33E, the position of the bucket control valve 33E is switched, and the bucket cylinder C5 extends or contracts in accordance with the position.

As described above, the operator or the like is able to operate the machine body 2, the boom 15, the arm 16, and the bucket (working tool) 17 by manipulating the manipulator 19L and the manipulator 19R.

As illustrated in FIG. 1, the working machine 1 includes the controller 60, a communicator 61, and an operation detector 62. The controller 60 performs hydraulic control of the solenoid valves and so forth, as described above. The controller 60 includes central processing unit (CPU) that executes instructions of a program, read only memory (memories) (ROM) storing computer program(s), random access memory (memories) (RAM) to which various control programs are loaded, storage unit(s) (recording medium) such as memory (memories) that stores various control programs and various data, and/or the like.

The communicator 61 is a communicator (communication module) that performs either direct communication or indirect communication with an external device, and is capable of performing wireless communication using, for example, Wi-Fi (Wireless Fidelity, registered trademark) of the IEEE 802.11 series, which is a communication standard, BLE (Bluetooth (registered trademark) Low Energy), LPWA (Low Power, Wide Area), LPWAN (Low-Power Wide-Area Network), or the like. Alternatively, the communicator 61 may be a communicator (communication module) that performs wireless communication via a mobile phone communication network, a data communication network, or the like.

The operation detector 62 is an angle sensor that detects a rotation angle of a member included in a work portion with respect to another member, or a device that detects a stroke of a hydraulic cylinder. The rotation angle and the stroke are operation information obtained when the working machine 1 is actuated. Specifically, the operation detector 62 includes potentiometers 62*a* and the hydraulic sensors 62*b*. The potentiometers 62*a* are each provided on, for example, a corresponding one of a rotation shaft (first rotation shaft) between the boom 15 and the arm 16, a rotation shaft (second rotation shaft) between the boom 15 and the machine body 2, a rotation shaft (third rotation shaft) between the bucket (working tool) 17 and the arm 16, and/or the like. Thus, the potentiometers 62*a* detect the rotations of the first rotation shaft, the second rotation shaft, and the third rotation shaft, thereby detecting an angle between the boom 15 and the arm 16 (first angle θ1), an angle of the boom 15 with respect to the machine body 2 (second angle θ2), an angle of the bucket 17 with respect to the arm 16 (third angle θ3), and so forth. That is, the operation detector 62 is capable of detecting the attitudes of the work portions by using the first angle θ1, the second angle θ2, and the third angle θ3 obtained by the potentiometers 62*a*.

The method for detecting the attitudes of the work portions (operation information) by the operation detector 62 is not limited to the method using the potentiometers 62*a*. For example, the operation detector 62 may include stroke sensors (not illustrated) that detect the strokes of the respective hydraulic cylinders (for example, the boom cylinder C3, the arm cylinder C4, and the bucket cylinder C5), instead of the potentiometers 62*a*. In this case, the operation detector 62 determines the first angle θ1, the second angle θ2, and the third angle θ3 based on detection results of these stroke sensors, and detects the attitudes of the work portions.

As illustrated in FIG. 2, the hydraulic sensors 62*b* are each provided near the port through which a hydraulic fluid is introduced/discharged in a corresponding one of the boom cylinder C3, the arm cylinder C4, and the bucket cylinder C5, and are each capable of detecting the pressure (hydraulic cylinder pressure) of a corresponding one of the boom cylinder C3, the arm cylinder C4, and the bucket cylinder C5.

That is, the operation detector 62 detects, as operation information, the attitudes of the work portions, hydraulic cylinder pressures, and so forth. The operation detector 62 outputs the detected operation information to the communicator 61. The communicator 61 transmits the operation information output from the operation detector 62 to the outside.

As illustrated in FIG. 1, the lifetime estimation system for a working machine includes a manager 100. The lifetime of a specific portion of a working machine is estimated based on operation information collected from a plurality of working machines 1 or the like.

The manager 100 is capable of communicating with the communicator 61, and includes a strain calculator 101 and a lifetime calculator 102. The strain calculator 101 and the lifetime calculator 102 include electric/electronic circuit(s) provided in the manager 100, program(s) stored in the manager 100, and/or the like.

The strain calculator 101 calculates a strain occurred in a lifetime estimation target portion of the working machine 1 based on the operation information detected by the operation detector 62. For example, the strain calculator 101 calculates the strain based on a hydraulic cylinder pressure obtained when a hydraulic actuator is actuated, and attitude information.

Specifically, the strain calculator 101 has an analysis model for calculating loads (reaction forces) that act on the hydraulic actuators such as the boom cylinder C3, the arm cylinder C4, and the bucket cylinder C5 from data of the structure body of the working machine 1, hydraulic cylinder pressures of the hydraulic cylinders that drive the work portions (the boom cylinder C3, the arm cylinder C4, the bucket cylinder C5, and so forth), and attitude information of the work portions (the first angle θ1, the second angle θ2, the third angle θ3, and so forth). Accordingly, the strain calculator 101 calculates the strain of a certain portion (lifetime estimation target portion) of the boom 15, the arm 16, and/or the bucket (working tool) 17 from the load(s) (reaction force(s)) that act on the hydraulic actuators obtained from the analysis model.

That is, the strain calculator 101 performs structure analysis based on prepared data of a structure body, hydraulic cylinder pressures of the hydraulic cylinders that drive the work portions, and attitude information of the work portions. Through the structure analysis, the strain calculator 101 calculates a stress in a certain portion (lifetime estimation target portion) of the boom 15, the arm 16, and the bucket (working tool) 17, that is, induced strain (strain).

A database 104 may store in advance data (three-dimensional matrix data) in which hydraulic cylinder pressures of the hydraulic cylinders (the boom cylinder C3, the arm cylinder C4, the bucket cylinder C5, and so forth) that drive the work portions, attitude information of the work portions (the first angle θ1, the second angle θ2, the third angle θ3, and so forth), and induced strain (strain) in a predetermined portion (lifetime estimation target portion) of the boom 15, the arm 16, and the bucket (working tool) 17 are associated with each other, and the strain calculator 101 may calculate the strain of the lifetime estimation target portion by referring to the data.

The lifetime calculator 102 calculates a lifetime by comparing the induced strain (strain) in the predetermined portion and calculated by the strain calculator 101, with the strength of the predetermined portion obtained from the data of the structure body of the boom 15, the arm 16, and the bucket (working tool) 17. For example, the lifetime calculator 102 obtains a distribution of induced strains (strains), compares the occurrence frequency (the number of occurrences) of induced strain equal to or greater than a predetermined value in the distribution with the strength of the predetermined portion, and thereby determines whether the lifetime of the predetermined portion is short or long.

The strain calculator 101 and/or the lifetime calculator 102 may perform the above-described calculation by using artificial intelligence, such as machine learning including deep learning. Specifically, the strain calculator 101 and/or the lifetime calculator 102 has a trained model obtained through deep learning; applies, to the trained model, induced strain (strain) and the strength of a predetermined portion obtained from the data of the structure body of the boom 15, the arm 16, and the bucket (working tool) 17; and thereby calculates a lifetime or determines whether the lifetime of the predetermined portion is long or short. Alternatively, the strain calculator 101 and/or the lifetime calculator 102 may have a trained model obtained by using a neural network using an algorithm other than deep learning, for example, a recurrent neural network. The trained model is a model for calculating induced strain (strain) in a predetermined portion (lifetime estimation target portion) of the boom 15, the arm 16, and the bucket (working tool) 17 based on the data of the structure body, the hydraulic cylinder pressures of the hydraulic cylinders, and attitude information of the work portions, or a model for calculating or obtaining a lifetime based on induced strain (strain) and the data of the structure body.

Figure 3:
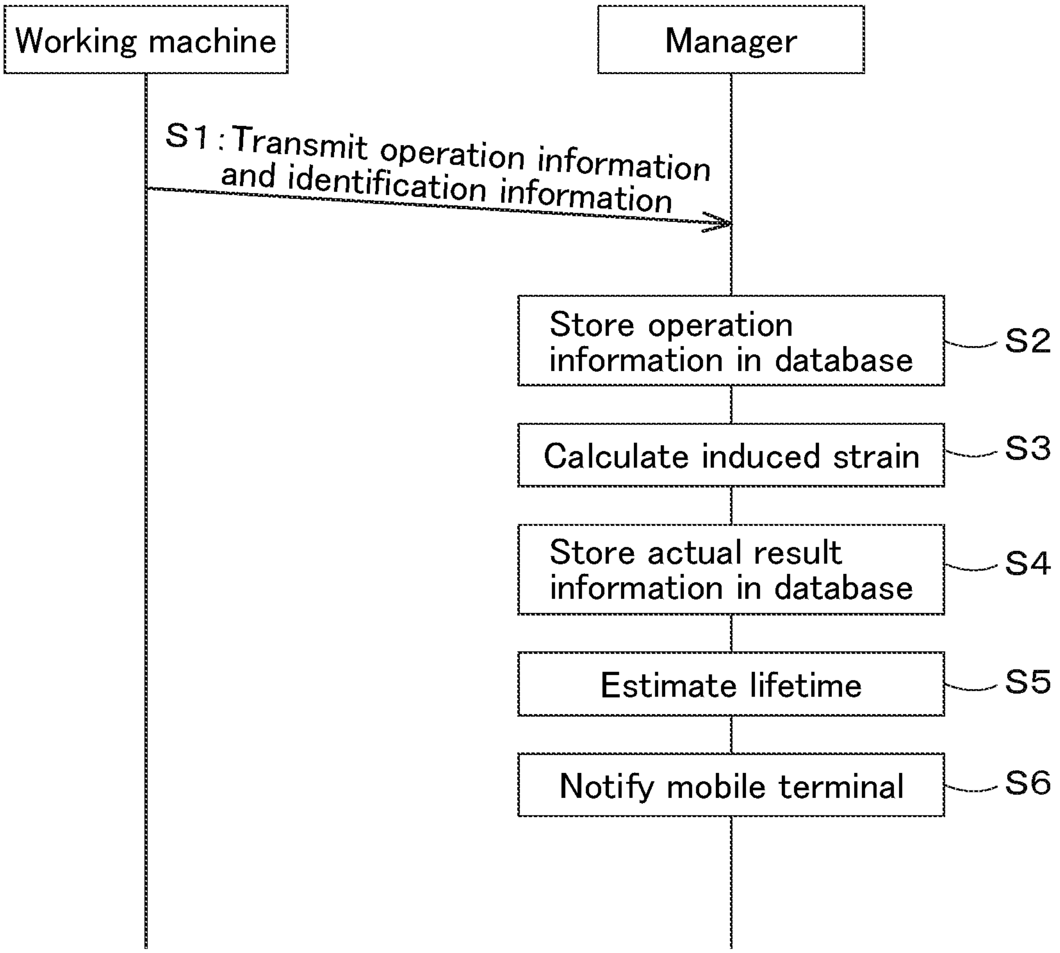
FIG. 3 is a diagram illustrating operation of the lifetime estimation system for a working machine.

FIG. 3 illustrates an operation flow of the lifetime estimation system for a working machine. As illustrated in FIG. 3, in response to the working machine 1 being actuated, the communicator 61 transmits operation information (the attitudes of work portions and hydraulic cylinder pressures) detected by the operation detector 62, and identification information identifying the working machine 1, to the manager 100 (S1). In response to receipt of the operation information and the identification information from the communicator 61 (S1), the manager 100 causes the database 104 to store the operation information, which is stored in units of working machines 1, that is, in units of pieces of identification information (S2).

In response to the database 104 storing the operation information in units of pieces of identification information (S2), the strain calculator 101 calculates induced strain (strain) based on the operation information (hydraulic cylinder pressures and attitude information) stored in the database 104 (S3). In response to the strain calculator 101 calculating induced strain (S3), the manager 100 causes the database 104 to store the induced strain, as actual result information in units of working machines 1 (S4).

Upon storage of induced strains in the database 104 on a per-working-machine-1 basis (S4), the lifetime calculator 102 refers to the database 104, calculates, from the actual result information, the number of occurrences of an induced strain equal to or greater than a predetermined value, and estimates a lifetime from the number of occurrences (S5). For example, the manager 100 causes the database 104 to store in advance data indicating, for each portion of a work portion, a relationship between a lifetime and the number of times an induced strain has become equal to or greater than the predetermined value, and the lifetime calculator 102 refers to the data to estimate the lifetime of a lifetime estimation target portion. The calculated lifetime decreases as the number of times an induced strain has become equal to or greater than the predetermined value increases. The predetermined value may be set for each portion of the work portion. The above-described lifetime estimation method is illustrative, and is not restrictive.

In response to the lifetime calculator 102 estimating the lifetime (S5), the manager 100 provides a notification about a lifetime estimation result (S6). When there is a portion having an estimated lifetime equal to or shorter than a predetermined period, the manager 100 may notify a predetermined mobile terminal 105 or the like of the portion having the short lifetime and that the lifetime is equal to or shorter than the predetermined period, instead of providing the lifetime estimation result.

Figure 4:
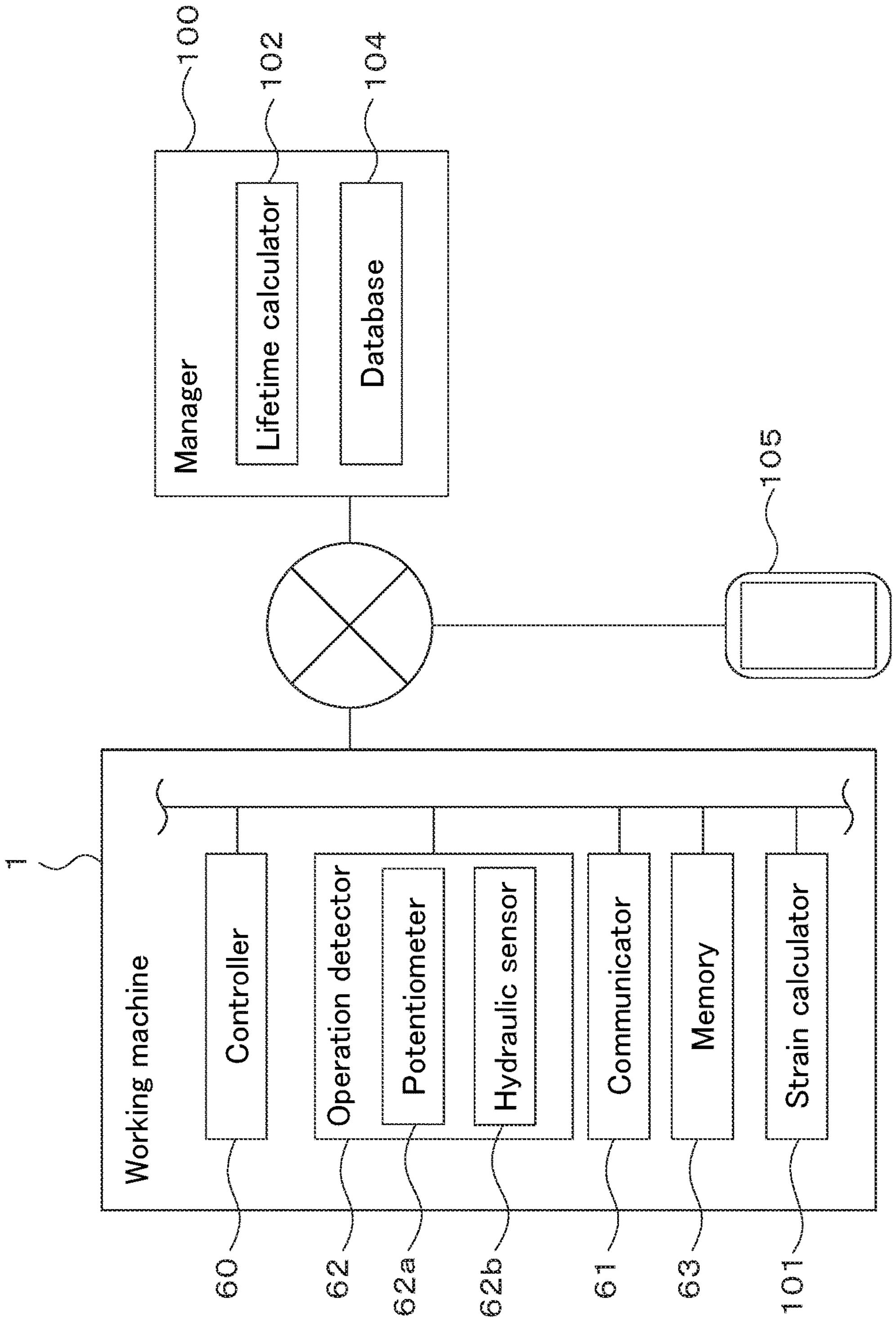
FIG. 4 illustrates an overall view of a lifetime estimation system for a working machine according to a first modification.

In the above-described embodiment, the manager 100 includes the strain calculator 101. Alternatively, as illustrated in FIG. 4, the working machine 1 may include the strain calculator 101 and a memory 63. In this case, the memory 63 stores first data (three-dimensional matrix data) in which hydraulic cylinder pressures of the hydraulic cylinders (the boom cylinder C3, the arm cylinder C4, the bucket cylinder C5, and so forth) that drive the work portions, attitude information of the work portions (the first angle θ1, the second angle θ2, the third angle θ3, and so forth), and induced strain in a predetermined portion (lifetime estimation target portion) of the boom 15, the arm 16, and/or the bucket (working tool) 17 are associated with each other. The strain calculator 101 calculates a frequency distribution of strains in the lifetime estimation target portion based on the hydraulic cylinder pressures and the attitude information detected by the operation detector 62 and the first data stored in the memory 63. Subsequently, the communicator 61 transmits the frequency distribution of strains calculated by the strain calculator 101 to the manager 100.

The manager 100 includes the lifetime calculator 102 and the database 104. The lifetime calculator 102 calculates the lifetime of a lifetime estimation target portion in the working machine 1 based on the frequency distribution of strains received from the working machine 1 and the correspondence between the frequency distribution of strains and the lifetime stored in the database 104.

Figure 5:
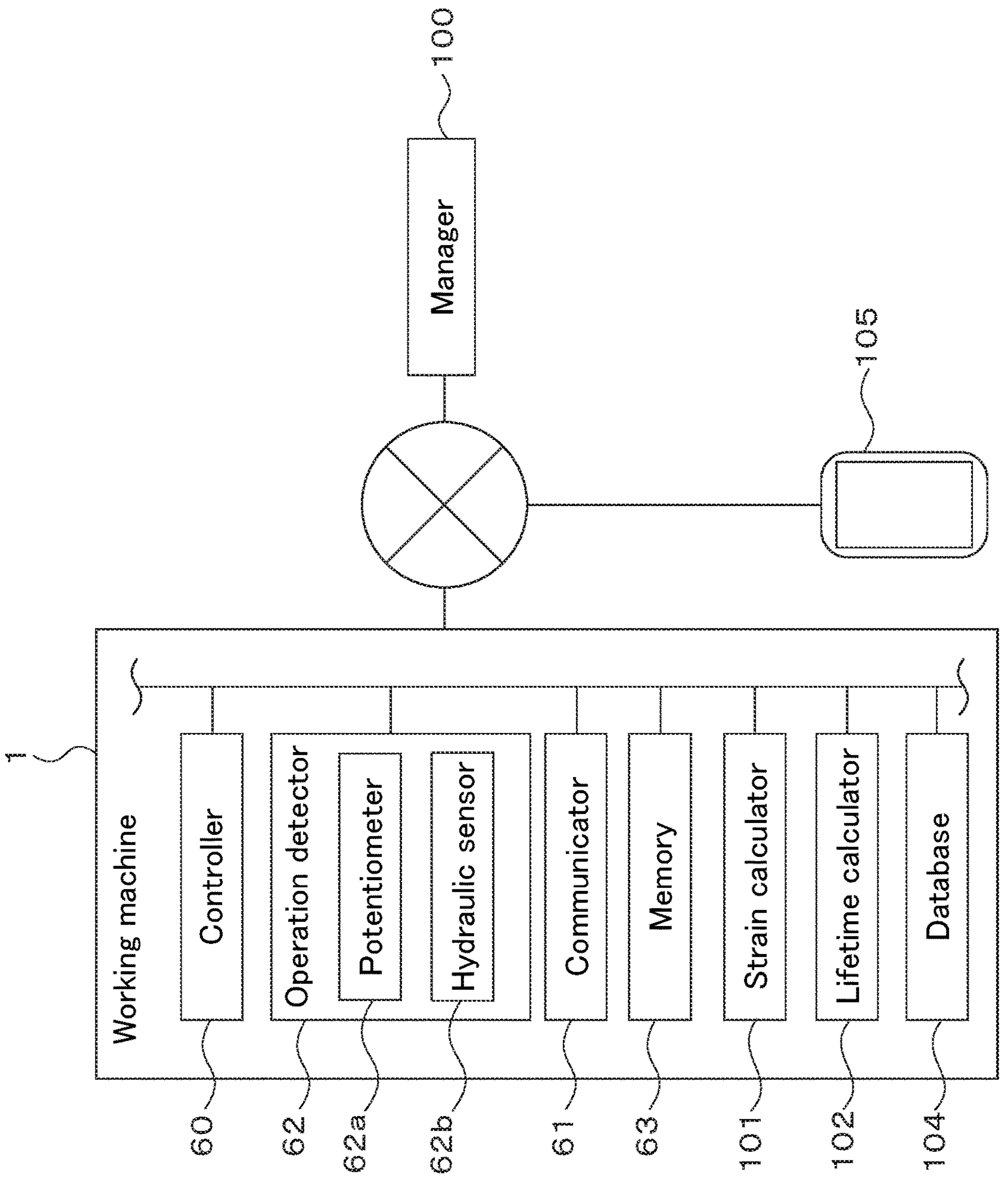
FIG. 5 illustrates an overall view of a lifetime estimation system for a working machine according to a second modification.
Figure 6:
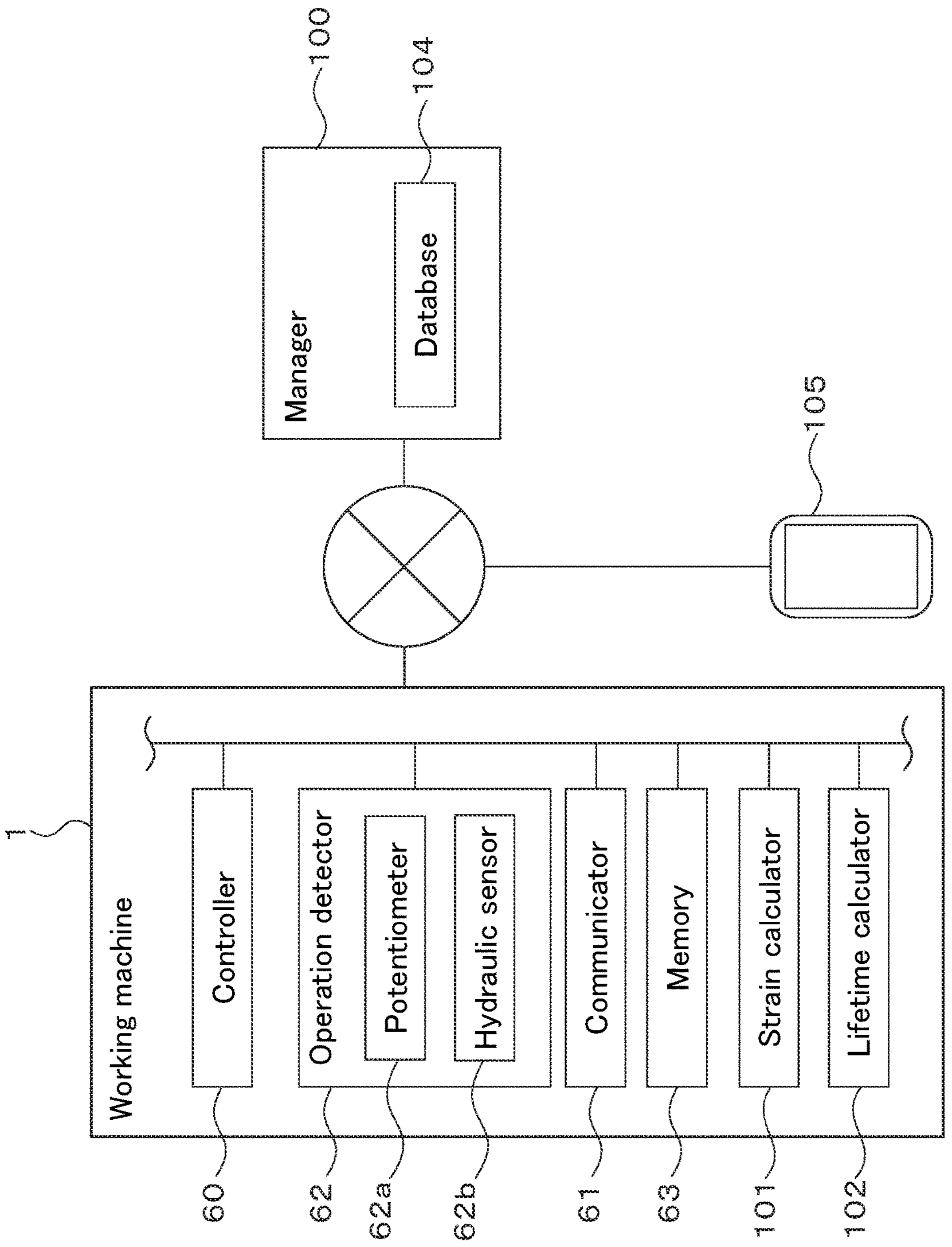
FIG. 6 illustrates an overall view of a lifetime estimation system for a working machine according to a third modification.

Alternatively, as illustrated in FIG. 5, the working machine 1 may include the memory 63, the strain calculator 101, the lifetime calculator 102, and the database 104, and the working machine 1 may calculate a strain and a lifetime. Alternatively, as illustrated in FIG. 6, the working machine 1 may include the memory 63, the strain calculator 101, and the lifetime calculator 102, and the manager 100 may include the database 104. In this case, the working machine 1 communicates with the manager 100 and uses the information in the database 104 to calculate a lifetime.

A lifetime estimation system for a working machine 1 is a lifetime estimation system for a working machine 1 including a work portion provided on a machine body 2, a hydraulic actuator to actuate the work portion, and an operation detector 62 to detect operation information obtained when the work portion and/or the hydraulic actuator is or are actuated, the lifetime estimation system including: a strain calculator 101 to calculate a strain of a target portion to be subjected to lifetime estimation based on the operation information detected by the operation detector 62; and a lifetime calculator 102 to calculate a lifetime of the target portion from the strain calculated by the strain calculator 101. With this, the strain calculator 101 determines a strain from the operation information obtained when the work portion and/or the hydraulic actuator is/are actuated, and thus the lifetime calculator 102 is capable of easily estimating the lifetime of the lifetime estimation target portion of the working machine 1. That is, the lifetime estimation system for a working machine 1 is capable of easily estimating the lifetime of member(s) included in the working machine 1 based on the operation information of the working machine 1.

The operation detector 62 may be operable to detect, as the operation information, a hydraulic cylinder pressure which is a hydraulic pressure of a hydraulic cylinder as the hydraulic actuator, and attitude information which is information about an attitude of the work portion. The strain calculator 101 may be configured or programmed to calculate the strain based on the hydraulic cylinder pressure and the attitude information. With this, the strain calculator 101 is capable of easily determining a strain based on the hydraulic cylinder pressure and the attitude information obtained when the hydraulic actuator is actuated, and the lifetime calculator 102 is capable of estimating the lifetime from the strain determined by the strain calculator 101.

The operation detector 62 may be operable to detect, as the attitude information, a rotation angle of a member included in the work portion relative to another member or a stroke of the hydraulic cylinder. With this, the strain calculator 101 is capable of easily determining a strain based on the rotation angle or the stroke of the hydraulic cylinder detected by the operation detector 62.

The lifetime calculator 102 may be configured or programmed to calculate the lifetime of the target portion based on the number of occurrences of a strain equal to or greater than a predetermined value. With this, for example, the lifetime calculator 102 is capable of determining that the lifetime of a predetermined portion is short if the number of occurrences of a strain equal to or greater than the predetermined value is large, and determining that the lifetime of the predetermined portion is long if the number of occurrences is small.

The lifetime estimation system may further include: a communicator 61 provided in or on the working machine 1 to transmit the operation information; and a manager 100 to estimate the lifetime of the target portion included in the working machine 1 based on the operation information transmitted from the communicator 61, the manager 100 including the strain calculator 101 and the lifetime calculator 102. With this, the manager 100 is capable of collecting the operation information of the working machine 1 and easily estimating the lifetime from the collected operation information.

The working machine 1 may include the strain calculator 101 and a communicator 61 to transmit information about the strain calculated by the strain calculator 101. The lifetime estimation system may include a manager 100 to estimate the lifetime of the target portion included in the working machine 1 based on the information about the strain transmitted from the communicator 61, the manager 100 including the lifetime calculator 102. With this, the working machine 1 is capable of easily determining a strain. Since the working machine 1 transmits the determined strain to the manager 100, the manager 100 is capable of easily determining lifetime. That is, the lifetime can be easily determined by cooperation between the working machine 1 and the manager 100.

The lifetime estimation system for a working machine 1 may be arranged such that the working machine 1 includes the strain calculator 101 and the lifetime calculator 102. With this, the working machine 1 is capable of easily determining lifetime without having to communicate with the manager 100.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:

a machine body:

a work portion provided on the machine body, the work portion including a boom including a proximal end connected to the machine body via a first pivot such that the boom is rotatable relative to the machine body about the first pivot, an arm including a proximal end connected to a distal end of the boom via a second pivot such that the arm is rotatable relative to the boom about the second pivot, and a working tool connected to a distal end of the arm via a third pivot such that the working tool is rotatable relative to the arm about the third pivot;

a plurality of hydraulic cylinders, the plurality of hydraulic cylinders including a boom cylinder activatable to rotate the boom relative to the machine body about the first pivot, an arm cylinder activatable to rotate the arm relative to the boom about the second pivot, and a working tool cylinder activatable to rotate the working tool relative to the arm about the third pivot;

one or more sensors configured to detect operation information including respective hydraulic cylinder pressures of the boom cylinder, the arm cylinder and the working tool cylinder, which are a hydraulic pressure of the boom cylinder, a hydraulic pressure of the arm cylinder and a hydraulic pressure of the working tool cylinder, and the attitude information including respective rotation angles of the boom, the arm and the working tool, which are a rotation angle of the boom about the first pivot, a rotation angle of the arm about the second pivot and a rotation angle of the working tool about the third pivot; and one or more processors configured or programmed to calculate a strain for each of respective target portions of the boom, the arm and the working tool to be subjected to lifetime estimation based on corresponding one or more of the respective hydraulic cylinder pressures and corresponding one or more of the respective rotation angles, included in the operation information detected by the one or more sensors, obtain information about the number of occurrences, on each of the respective target portions, of one or more specific strains that are determined to be equal to or greater than a predetermined value set for the corresponding target portion and selected from all the strains calculated for the corresponding target portion, estimate a lifetime for each of the respective target portions based on the information about the number of occurrences, on the corresponding target portion, of the one or more specific strains, and provide a notification about the lifetime estimated for each of the respective target portions.

2. The working machine according to claim 1, further comprising:

a memory and/or a storage as a database that stores first data indicating, for each of the respective target portions, a relation among a corresponding one of the respective hydraulic cylinders, a corresponding one of the respective rotation angles and a strain to be induced on the corresponding target portion, and second data indicating, for each of the respective target portions, a relation between a lifetime and the number of occurrences of a strain equal to or greater than the predetermined value corresponding to a structure body of the working machine at the corresponding target portion; wherein the one or more processors are configured or programmed to calculate the strain for each of the corresponding target portions by performing structure analysis based on the first data from the database and corresponding one or more of the respective hydraulic cylinder pressures and corresponding one or more of the respective rotation angles, included in the operation information detected by the one or more sensors; and estimate the lifetime for each of the respective target portions based on the second data from the database and the information about the number of occurrences, on the corresponding target portion, of the one or more specific strains.

3. The working machine according to claim 1, further comprising:

a communicator communicably connected to a manager computer which is a non-transitory computer located remotely from the working machine, the manager computer including a database that stores first data indicating, for each of the respective target portions, a relation among corresponding one or more of the respective hydraulic cylinders, corresponding one or more of the respective rotation angles and a strain to be induced on the corresponding target portion, and second data indicating, for each of the respective target portions, a relation between a lifetime and the number of occurrences of a strain equal to or greater than the predetermined value corresponding to a structure body of the working machine at the corresponding target portion; and the one or more processors are configured or programmed to calculate the strain for each of the respective target portions by performing structure analysis based on the first data received via the communicator of the working machine from the database of the manager computer and corresponding one or more of the respective hydraulic cylinder pressures and corresponding one or more of the respective rotation angles, included in the operation information detected by the one or more sensors, and estimate the lifetime for each of the respective target portions based on the second data received via the communicator of the working machine from the database of the manager computer and the information about the number of occurrences, on the corresponding target portion, of the one or more specific strains.

* * * * *